United States Patent
Zhang (10) Patent No.: US 7,855,956 B2
(45) Date of Patent: Dec. 21, 2010

(54) METHOD AND SYSTEM FOR CONTROLLING THE MULTICAST SOURCE

(75) Inventor: Guangming Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 637 days.

(21) Appl. No.: 10/562,713

(22) PCT Filed: Dec. 31, 2003

(86) PCT No.: PCT/CN03/01159

§ 371 (c)(1),
(2), (4) Date: Dec. 23, 2005

(87) PCT Pub. No.: WO2004/114619

PCT Pub. Date: Dec. 29, 2004

(65) Prior Publication Data

US 2007/0115975 A1    May 24, 2007

(30) Foreign Application Priority Data

Jun. 26, 2003  (CN) ............................ 03 1 45506

(51) Int. Cl.
*H04L 12/26* (2006.01)
*H04L 12/56* (2006.01)
*H04L 12/28* (2006.01)
*H04L 9/32* (2006.01)
*G06F 15/173* (2006.01)

(52) U.S. Cl. ................. 370/230; 370/392; 370/401; 709/225; 713/170

(58) Field of Classification Search ............ 370/230, 370/312, 389, 400, 401, 432, 392, 466; 709/238, 709/245, 249

See application file for complete search history.

(56) References Cited

U.S. PATENT DOCUMENTS 6,046,989 A * 4/2000 Takahashi ............... 370/312
6,065,064 A * 5/2000 Satoh et al. .............. 709/249

(Continued)

FOREIGN PATENT DOCUMENTS

CN       1395388 A      2/2003

(Continued)

*Primary Examiner*—Jayanti K Patel
*Assistant Examiner*—Christopher T Wyllie
(74) *Attorney, Agent, or Firm*—Slater & Matsil, L.L.P.

(57) ABSTRACT

The invention provides a method on the source of the multicast control, including: establish the source of the multicast authentication message; the source of the multicast authentication message controlling terminal updates the said the source of the multicast authentication message dynamic according to the limit of the multicast source; control the multicast message transmitted by the multicast source according to the said multicast source authentication message; the invention also provides a system on the source of the multicast control, including: master multicast source authentication server, a group of slave multicast source authentication server preset point; by this invention, the preset point request the multicast source authentication application so as to control managing the multicast source at the first time; manage different multicast addresser by setting the multicast source authentication server layer distribution, saving the resource of the net terminal; without human operation, master and slave multicast source authentication server interactive authentication message periodically and in time, so as to manage the multicast source automatically and in time; thereby realize the purpose which reduce managing and maintenance cost of the multicast internet, improve the administrating and the running ability.

5 Claims, 3 Drawing Sheets

U.S. PATENT DOCUMENTS

| | | | | |
|---|---|---|---|---|
| 6,223,286 B1* | 4/2001 | Hashimoto | ............... | 713/178 |
| 6,401,130 B1* | 6/2002 | Cain | ............... | 709/245 |
| 6,587,943 B1* | 7/2003 | Hardjono | ............... | 713/163 |
| 6,862,684 B1* | 3/2005 | DiGiorgio | ............... | 713/163 |
| 7,046,666 B1* | 5/2006 | Bollay et al. | ............... | 370/392 |
| 2001/0023487 A1* | 9/2001 | Kawamoto | ............... | 713/202 |
| 2002/0091926 A1* | 7/2002 | Fukutomi | ............... | 713/170 |
| 2002/0165977 A1* | 11/2002 | Novaes | ............... | 709/238 |
| 2002/0196782 A1* | 12/2002 | Furukawa et al. | ............... | 370/352 |
| 2003/0061333 A1* | 3/2003 | Dean et al. | ............... | 709/223 |
| 2003/0086425 A1* | 5/2003 | Bearden et al. | ............... | 370/392 |
| 2004/0252717 A1* | 12/2004 | Solomon et al. | ............... | 370/466 |
| 2004/0264443 A1* | 12/2004 | Beck et al. | ............... | 370/352 |
| 2005/0091313 A1* | 4/2005 | Zhou et al. | ............... | 709/204 |
| 2006/0023733 A1* | 2/2006 | Shimizu et al. | ............... | 370/432 |
| 2006/0109795 A1* | 5/2006 | Kamata et al. | ............... | 370/252 |
| 2007/0076703 A1* | 4/2007 | Yoneda et al. | ............... | 370/389 |
| 2007/0115975 A1* | 5/2007 | Zhang | ............... | 370/390 |

FOREIGN PATENT DOCUMENTS

| | | | |
|---|---|---|---|
| CN | 1414759 A | | 4/2003 |
| CN | 1419363 A | | 5/2003 |
| CN | 1452347 A | | 10/2003 |
| WO | WO 00/33509 | * | 6/2000 |
| WO | WO 0033509 | * | 6/2000 |

\* cited by examiner

METHOD AND SYSTEM FOR CONTROLLING THE MULTICAST SOURCE

This application is a continuation of International Application No. PCT/CN2003/001159, filed on Dec. 31, 2003, which claims priority to Chinese Patent Application No. 03145506.9, filed on Jun. 26, 2003, both of which are hereby incorporated by reference in their entireties.

FIELD OF THE INVENTION

The present invention relates to the field of network communication technology, particularly to a method and system for controlling the multicast source.

BACKGROUND OF THE INVENTION

As multimedia services, such as stream media, videoconference, Video On Demand, etc. in Internet develop, multicast technology has become a key technology in broadband multimedia applications, and more and more multicast data messages are transmitted over network. However, the existing multicast networks are poor in manageability and operability and can not meet the demand for future network development.

In an existing multicast network, a valid unicast internet protocol (IP) address can be used as a multicast source to send multicast messages to the multicast network, with a multicast address as the destination address. At the same time, the terminals in the network declare to the multicast network their needs for multicast messages from a certain multicast address through Internet Group Management Protocol (IGMP); if the network supports multicast protocol, the multicast messages will reach the recipient via a route specified in the multicast protocol.

In the above method of sending multicast messages from a multicast source, if a network terminal sends a great deal of multicast messages to the multicast network maliciously with a valid unicast IP address as the multicast source address, a large number of nonsensical multicast messages will be transmitted over the multicast network, and thereby occupy the network resources to a great extent, causing interference to normal operation of the multicast system, and even paralysis of the system.

In order to protect the multicast system against attacks from malicious multicast messages, multicast sources shall be controlled strictly, so that only authorized multicast sources can send multicast messages to the multicast network.

In existing multicast networks, Access Control Lists (ACLs) are usually used to restrict the address range of multicast sources that send multicast messages to specific multicast addresses, and thereby control the multicast messages sent from multicast sources.

Information in the ACL includes the corresponding relationship between multicast source address and multicast address.

The rules of ACL are as followings: 1. in default, multicast messages with a multicast address as the destination address are not permitted to enter into the multicast network; 2. if a multicast address in ACL corresponds to a multicast source address, multicast messages with the multicast source address as the source address and the multicast address as the destination address are permitted to enter into the multicast network. Wherein, the priority of rule 2 is higher than that of rule 1.

The detailed method of implementing control management of multicast source with ACL is as following: the ACL is configured in the router on access layer and the switch of the multicast network; the switch and the router support ACL rules and filter off multicast messages sent from multicast sources not permitted to send multicast messages to specific multicast addresses in accordance with the ACL, or the switch and the router only forward multicast messages sent from specific multicast sources to specific multicast groups.

The above method is implemented as follows: when the switch or the router on the access layer receives a multicast message, judging, according to the configured ACL thereof, whether the source address of the received multicast message is within the range specified by the ACL; if the source address is within the range specified by the ACL, it indicates that the source unicast IP address of the multicast message is permitted to send multicast messages to the destination address of the multicast message, the switch or the router on the access layer permits the multicast message to enter into the multicast network by means of forwarding the multicast message; if the source address is not within the range specified by the ACL, it indicates that the source address of the multicast message is not permitted to send multicast messages to the destination address of the multicast message, the switch or the router on the access layer does not permit the multicast message to enter into the multicast network by means of discarding the multicast message, not creating forwarding route for it, etc. In this way, the multicast sources are controlled by implementing the above mentioned method.

The ACLs configured in the routers on the access layer and the switches are static. When the restriction to multicast source or multicast address is to be modified, i.e., the content in the ACLs is to be modified, the ACLs in individual routers on the access layer and switches have to be modified manually. The fact that the change in ACL content being not flexible and requiring manual intervention is not fit for automatic real time management of multicast sources in the multicast network, resulting in high cost in management and maintenance and poor manageability and operability of the multicast network.

SUMMARY OF THE INVENTION

An object of the present invention is to provide a method for controlling the multicast source, which implements real time control management of multicast sources at the earliest time by configuring multicast source authentication servers hierarchically and distributedly, and dynamically updating multicast source authentication information in master and slave multicast source authentication servers, so as to reduce management and maintenance cost as well as improve manageability and operability of multicast network.

In order to achieve the above object, the multicast source control method provided by an embodiment of the present invention comprises:

a. creating multicast source authentication information;

b. a management platform of the multicast source authentication information dynamically updating said multicast source authentication information in accordance with restriction on multicast source;

c. controlling multicast message sent from the multicast source in accordance with said multicast source authentication information.

Said step a comprises:

creating multicast source authentication information in master multicast source authentication server and slave multicast source authentication server, respectively;

wherein the management platform of the multicast source authentication information in said step b comprises a master multicast source authentication server.

Said multicast source authentication information is recorded in a tabular form;

said multicast source authentication information table contains a corresponding relationship between multicast source address and multicast address;

said multicast address is a result of AND operation on multicast address and address mask.

Said step b comprises:

said slave multicast source authentication server, in accordance with the multicast source authentication information in the master multicast source authentication server, updating the multicast source authentication information stored therein at a predefined period;

when the multicast source authentication information in said master multicast source authentication server is changed, notifying said slave multicast source authentication server to update the multicast source authentication information stored therein.

Said Step c Comprises:

c1. after receiving a multicast message sent from the multicast source, a predefined node initiating an authentication request to the preconfigured multicast source authentication server thereof;

c2. said multicast source authentication server performing a longest prefix matching with the multicast address contained in the authentication request based on the multicast address in the multicast source authentication information table stored therein, and sending a response indicating whether the authentication request is successful to said predefined node according to the matching result;

c21. if the multicast source address corresponding to the matched multicast address is identical to the multicast source address in said authentication request, sending a response indicating that the authentication request is successful to said predefined node; after receiving the response indicating that the authentication request is successful, said predefined node permitting said multicast message to enter into the multicast network;

c22. if the multicast source address corresponding to the matched multicast address is different from the multicast source address in said authentication request, sending a response indicating that the authentication request has failed, to said predefined node; after receiving the response indicating that the authentication request has failed, said predefined node forbidding said multicast message to enter into the multicast network.

Said multicast source authentication information table further contains records indicating that it is needed for authentication requests to continue to be initiated to other multicast source authentication servers, the records corresponding to addresses of said other multicast source authentication servers.

Said Step c2 Further Comprises:

c23. if the matched multicast address corresponds to an address of other multicast source authentication server, sending said predefined node information indicating that said predefined node information is needed to continue to request for authentication from other multicast source authentication servers, and information of the address of said other multicast source authentication servers; said predefined node reinitiating an authentication request for the multicast source of said multicast message according to the received information.

The method described in an embodiment of the present invention also comprises:

if the number of authentication request sent from said predefined node for the multicast source of said multicast message exceeds a predefined number, the authentication request for the multicast source being deemed as failed.

The method described in an embodiment of the present invention also comprises: if said predefined node does not receive a response in predefined time after initiating the authentication request for the multicast source of said multicast message, the authentication request for said multicast source being deemed as failed.

The present invention also provides a multicast source control system, comprising:

a master multicast source authentication server;

a group of slave multicast source authentication servers; and a predefined node; wherein, when multicast source authentication information stored in the master multicast source authentication server is changed, the master multicast source authentication server notifies the slave multicast source authentication servers; when the master multicast source authentication server receives an authentication request transmitted from the predefined node, it transmits a corresponding authentication response to said predefined node in accordance with the authentication information stored therein;

the slave multicast source authentication servers update multicast source authentication information stored therein at a predefined period in accordance with the multicast source authentication information in the master multicast source authentication server; when the slave multicast source authentication servers receive an authentication message transmitted from the predefined node, they transmit a corresponding authentication response to said predefined node in accordance with the authentication information stored therein;

when the predefined node receives a multicast message sent from the multicast source, it initiates an authentication request to the preconfigured multicast source authentication server thereof, and controls the multicast message sent from the multicast source in accordance with the response from the multicast source authentication server.

Said predefined node is a router or a switch.

With the present invention, through deploying hierarchical distributed multicast source authentication servers to manage different multicast address fields, with each multicast source authentication server responsible for authentication of multicast sources corresponding to its subordinate multicast address field, network terminal resources are saved; through deploying master and slave multicast source authentication servers, the multicast source authentication information stored in the slave multicast source authentication servers is updated at a predefined period in accordance with the multicast source authentication information in the master multicast source authentication server, the slave multicast source authentication servers being automatically notified to update the multicast source authentication information thereof when authentication information stored in the master multicast source authentication server is changed, and the multicast source authentication information can be updated dynamically without manual intervention, thereby implementing real time management of the multicast sources; when a predefined node in the network receives a multicast message, it initiates an authentication request for the multicast source having sent the multicast message to the multicast source authentication server, so as to implement control management of multicast messages from the multicast source earliest; and thereby attain the object of reducing management and maintenance cost as well as improving manageability and operability of the multicast network.

DETAILED DESCRIPTION OF THE EMBODIMENTS

The present invention implements multicast source control management through creating multicast source authentication information, dynamically updating the multicast source authentication information by a management platform of the multicast source authentication information, and controlling multicast messages sent from multicast sources in accordance with the dynamically updated multicast source authentication information.

The dynamic update of multicast source authentication information by the management platform of the multicast source authentication information can be implemented by deploying a master multicast source authentication server and a plurality of slave multicast source authentication servers, with the following method: creating a multicast source authentication information table in the master and slave multicast source authentication servers respectively, with the master multicast source authentication server as management platform of the multicast source authentication information; the slave multicast source authentication servers obtaining the multicast source authentication information stored in the master multicast source authentication server at a predefined period to update the multicast source authentication information stored therein periodically; when the user modifies the multicast source authentication information in the master multicast source authentication server in accordance with the restriction to multicast sources that send multicast messages to the multicast address, the master multicast source authentication server notifying the slave multicast source authentication servers that the multicast source authentication information needs to be updated. The multicast source authentication information comprises the corresponding relationship between multicast address and multicast source address, which can be a many-to-many relationship, i.e., allowing a plurality of multicast sources to send multicast messages to the same multicast address, and one multicast source to send multicast messages to different multicast addresses. For a multicast address, only the multicast sources predefined in the multicast source authentication information table and corresponding to the multicast address are permitted to send multicast messages to it; multicast messages sent to the multicast address from other multicast sources are not permitted to enter into the multicast network.

The multicast source authentication servers can be deployed in a hierarchical distributed way. The so-called hierarchical deployment can be achieved by different ranges of multicast address field of the multicast source authentication information in different master multicast source authentication servers, and the multicast address field of the multicast source authentication information in the master multicast source authentication server on an upper level is wider than that in the master multicast source authentication server on a lower level. The so-called distributed deployment refers that a plurality of slave multicast source authentication servers corresponding to the master multicast source authentication server manage multicast source authentication requests corresponding to parts of multicast addresses of the multicast address field in the multicast source authentication information table which is in the master multicast source authentication server, respectively.

By deploying multicast source authentication servers in a hierarchical distributed way, when a slave multicast source authentication server receives a multicast source authentication request transmitted from a predefined node in the network, if the multicast address in the authentication request is not within the range of multicast address field in the multicast source authentication information thereof, it sends the addresses of other multicast source authentication servers to the predefined node, so that the predefined node can initiate authentication requests to the other multicast source authentication servers.

The hierarchical distributed deployment of master and slave multicast source authentication servers can be implemented by applying multicast address masks to multicast addresses, for example, the multicast source authentication information table can be created with multicast address+ address mask as the index, as shown in Table 1:

TABLE 1

| Multicast address | Attribute | Unicast Address |
| --- | --- | --- |
| 238.1.3/16 | HS | 168.202.2.2 |
| 238.1.3.1/24 | NS | 122.2.2.9 |
| 238.1.3.1/24 | S | 122.2.3.10 |
| 238.1.3.1/24 | S | 122.2.4.20 |
| 238.1.3.1/32 | A | 202.2.2.1 |
|  | A | 202.2.2.3 |
|  | A | 202.2.2.4 |

In Table 1, HS indicates that the authentication request shall be initiated to the multicast source authentication server on the upper level, the unicast address corresponding to HS is the address of the multicast source authentication server on the upper level. NS indicates that the authentication request shall be initiated to the master multicast source authentication server in the multicast address field, the unicast address corresponding to NS is the address of the master multicast source authentication server in the multicast address field. S represents a slave multicast source authentication server in the multicast address field, the unicast address corresponding to S is the address of the slave multicast source authentication server; when the communication between a predefined node and the master multicast source authentication server fails, the predefined node initiates authentication requests to its corresponding slave multicast source authentication server. A represents a multicast source address having permission to send, which corresponds to the multicast address field.

Hereunder, the present invention will be described with reference to the attached drawings, in order to make those skilled in the art understand the present invention more clearly.

Figure 1:
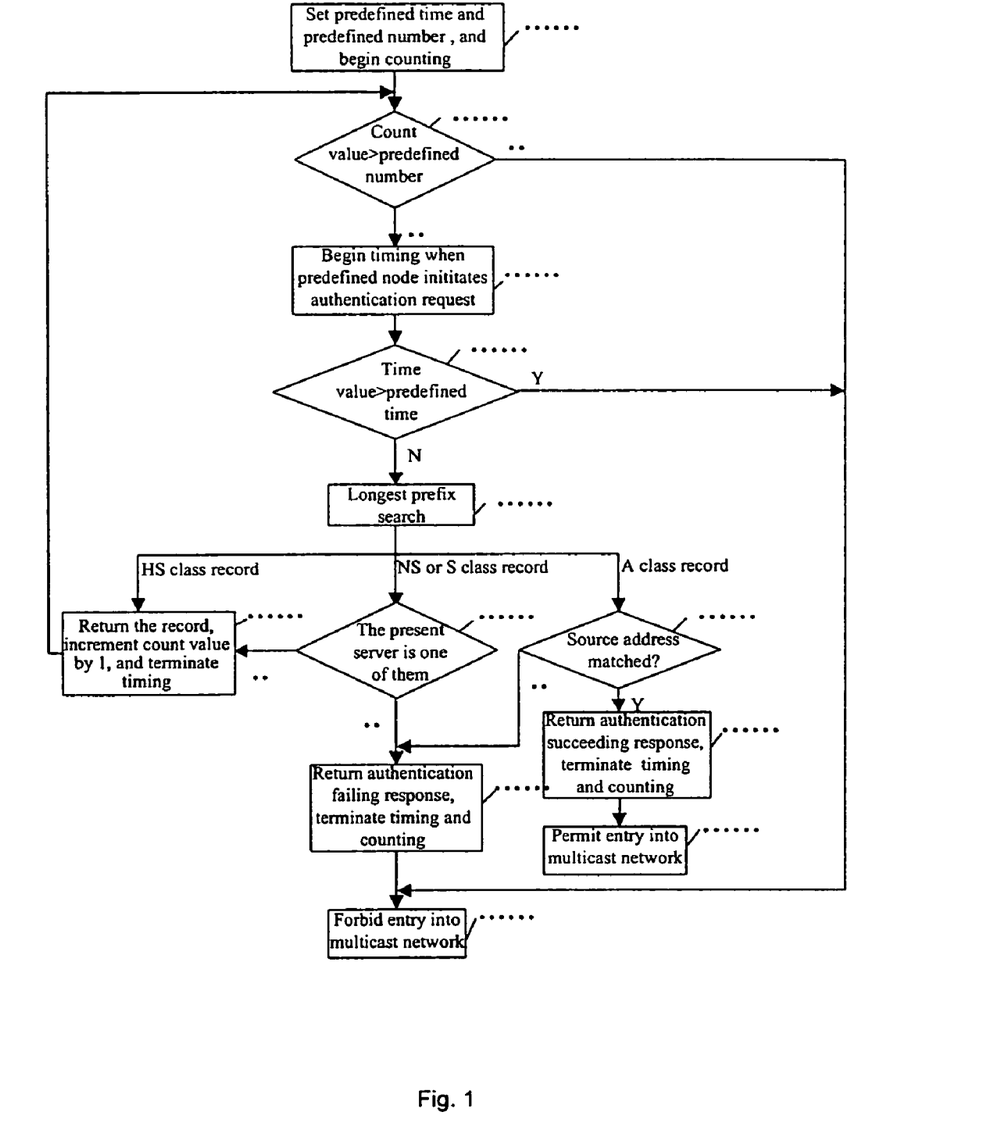
FIG. 1 is a flow diagram of a multicast source control method according to an embodiment of the present invention.

A flow diagram of the multicast source control method implemented in an embodiment of the present invention is shown in FIG. 1.

As shown in FIG. 1, in step 100, set predefined time and predefined number of authentication requests; when a predefined node receives a multicast message sent from a multicast source to a multicast address, start counting of the predefined number. In step 110, judge whether the count value is greater than the predefined number; if the count value is greater than the predefined number, go to step 181, the authentication request for the multicast source are considered as failed, and the predefined node forbids multicast messages sent from the multicast source to enter into the multicast network.

In step 110, if the count value is not greater than the predefined number, go to step 120, the predefined node initiates an authentication request for the multicast source to the preconfigured multicast source authentication server thereof and at the same time begins to time for the predefined time. The authentication request information contains the multicast source address and the destination address of the multicast message. In step 130, judge whether the time value timed for the authentication request is greater than the predefined time. If not, go to step 140 to perform a longest prefix search on the multicast address in the multicast source authentication request and the multicast address in multicast source authentication information of the multicast source authentication server. If the searched record is of HS class, go to step 150 to return the searched record to the predefined node, increment the count value for the predefined number by 1, and stop timing for the predefined time, and then go to step 110 to judge whether the count value is greater than the predefined number. If the count value is not greater than the predefined number, go to step 120, the predefined node initiates an authentication request for the multicast source to the unicast address corresponding to the HS class record. If the count value is greater than the predefined number, go to step 181, the authentication request for the multicast source is considered as failed, and the predefined node forbids multicast messages sent from the multicast source to enter into the multicast network.

In step 140, if the searched record is of NS or S class, go to step 160, to judge whether the address of the present authentication server is one of the unicast addresses corresponding to the searched record. For example, in Table 1, there are 3 entries that match the multicast address 238.1.3.1/24; if the address of the present authentication server is 122.2.3.10, which matches the unicast address in one of the records, go to step 180, to return a response to the predefined node indicating that the authentication has failed, and stop counting for the predefined number and timing for the predefined time, then go to step 181, the predefined node forbids multicast messages sent from the multicast source to enter into the multicast network. In step 160, if the authentication server address is not one of the unicast addresses corresponding to the searched record, go to step 150, to return the searched record to the predefined node, increment the count value for the predefined number by 1, and stop timing for the predefined time, then go to step 110 to judge whether the count value is greater than the predefined number. If the count value is not greater than the predefined number, go to step 120, the predefined node initiates authentication requests for the multicast source in accordance with the sequence of the searched records. For example, in Table 1, there are 3 searched entries matching the multicast address 238.1.3.1/24, and their attributes are NS, S, and S, respectively; then in accordance with the sequence of the searched records, an authentication request is initiated for the multicast source first to the multicast source authentication server for unicast address 122.2.3.9 corresponding to NS; if the communication with the multicast source authentication server for said unicast address fails due to network interruption, etc., an authentication request will be initiated for the multicast source to the multicast source authentication server for unicast address 122.2.3.10, in accordance with the sequence of the searched records.

In step 140, if the searched record is of A class, go to step 170 to judge whether the multicast source address of the authentication request matches the unicast address corresponding to the A class record. If it does, go to step 190, to return a response indicating the authentication is successful to the predefined node, and stop timing for the predefined time and counting for the predefined number, then go to step 191, the predefine node permits multicast messages to enter into the multicast network. If it does not match, go to step 180, to return a response indicating the authentication request has failed to the predefined node, and stop timing for the predefined time and counting for the predefined number, then go to step 181, the predefined node forbids multicast messages to enter into the multicast network.

If, in step 130, the predefined node does not receive any response when the time value for the present authentication request is greater than the predefined time, go to step 181, the authentication request for the multicast source are considered as failed, and the predefined node forbids multicast messages sent from the multicast source to enter into the multicast network.

Figure 2:
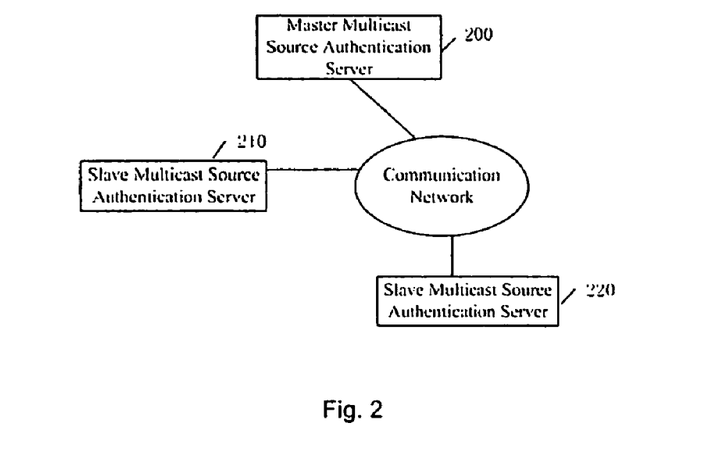
FIG. 2 is a schematic view of configuration of master and slave multicast source authentication servers according to an embodiment of the present invention.

The arrangement of the master and slave multicast source authentication servers according to an embodiment of the present invention is shown in FIG. 2.

In FIG. 2, a master multicast source authentication server 200 and slave multicast source authentication servers 210 and 220 are deployed.

Multicast source authentication information tables are stored in the master multicast source authentication server 200 and the slave multicast source authentication servers 210 and 220, respectively. The slave multicast source authentication server 210 and 220 update the multicast source authentication information stored therein, in accordance with a predefined period and the multicast source authentication information in the master multicast source authentication server 200, respectively.

The content of a multicast source authentication information table includes multicast address, attribute of multicast address, and corresponding relationship between multicast address and multicast source address. The multicast source authentication information table specifies multicast sources permitted to send multicast messages to specific multicast network groups; when a multicast network group is to be restricted, i.e., no multicast source is permitted to send multicast messages to it, the address information of the multicast network group and the address information of the multicast sources that are permitted to send multicast messages to it are recorded in the multicast network authentication information table. For example, if a user needs to restrict multicast sources for a specific multicast network group, by updating the multicast source authentication information table in the master multicast source authentication server 200, the multicast source authentication information table in the other multicast source authentication servers 210 and 220 will be updated automatically after a predefined time. When the multicast source authentication information table in the master multicast source authentication server 200 is changed, the slave multicast source authentication servers 210 and 220 are notified to update the multicast source authentication information table. In this way, when the authentication information is changed, only the authentication information table in the master multicast source authentication server needs to be modified, in such a way that all the authentication information stored in the slave multicast source authentication servers will be updated automatically, thereby real time control management of multicast sources is implemented.

Figure 3:
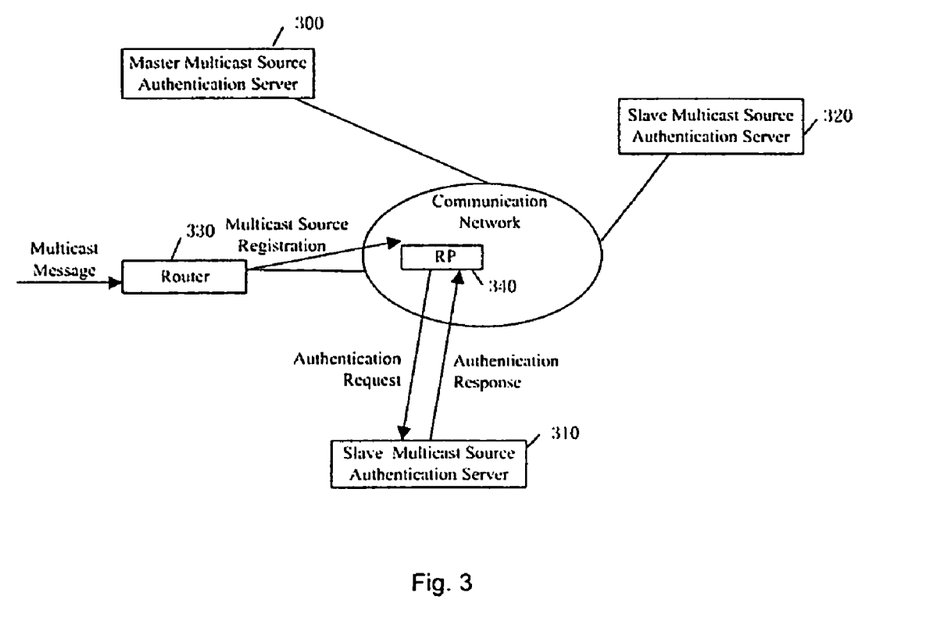
FIG. 3 is a schematic view of a multicast source control system for PIM—SM multicast network according to an embodiment of the present invention.

A system implementing multicast source control in a PIM—SM (Protocol Independent Mode—Sparse Mode) multicast network according to an embodiment of the present invention is shown in FIG. 3.

In FIG. 3, a master multicast source authentication server 300 and slave multicast source authentication servers 310 and 320 are deployed. The slave multicast source authentication servers 310 and 320 update the multicast source authentication information stored therein, in accordance with a predefined period and the multicast source authentication information in the master multicast source authentication server 300, respectively. When a user modifies the multicast source authentication information in the master multicast source authentication server 300 in accordance with the restriction on multicast address and multicast source, the master multicast source authentication server 300 notifies the slave multicast source authentication servers 310 and 320 that the multicast source authentication information needs to be updated.

For a PIM—SM multicast network, a predefined Rendezvous Point (RP) may taken as a predefined node that initiates authentication requests in the PIM—SM multicast network, as the multicast messages from each multicast source should be registered in the RP. In FIG. 3, RP 340 is the predefined node that initiates authentication requests. The slave multicast source authentication server nearest to RP 340 is selected as the multicast source authentication server for RP 340; in this embodiment, the multicast source authentication server configured for RP 340 is the slave multicast source authentication server 310.

After the router 330 in the multicast network receives a multicast message, it registers to RP 340; after receiving the register message, RP 340 initiates an authentication request to the slave multicast source authentication server 310, and the salve multicast source authentication server 310 judges whether the multicast message is permitted to enter into the multicast network according to the content of the authentication request and the content of the multicast source authentication table stored therein.

If the multicast address of the multicast message is within the range of multicast address field in the multicast source authentication information table of the slave multicast source authentication server 310, judge whether the multicast source address of the multicast message matches a unicast address corresponding to the multicast address field in the multicast source authentication information table. If it does not match, send response information indicating the authentication request has failed to RP 340; and RP 340 does not register the multicast message and forbids it to enter into the multicast network. If it matches, send response information indicating the authentication request is successful to RP 340; and RP 340 registers the multicast message and permits it to enter into the multicast network.

If the multicast address of the multicast message is not within the range of multicast address field in the multicast source authentication information table of the slave multicast source authentication server 310, the slave multicast source authentication server 310 judges whether an authentication request is needed to be reinitiated for the multicast source. If it is not needed to reinitiate an authentication request, send response information indicating the authentication request has failed to RP 340; and RP 340 does not register the multicast message and forbids it to enter into the multicast network. If it is needed to reinitiate an authentication request, the slave multicast source authentication server 310 sends information obtained by inquiry to RP 340; in accordance with the unicast address in the received information, RP 340 continues to initiate an authentication request for the multicast source.

The number of authentication request for a multicast message should not exceed a predefined number. If the number of authentication request is more than the predefined number but RP 340 still does not obtain a response indicating the authentication request is successful, it deems the authentication request for the multicast source of the multicast message as failed, and RP 340 does not register the multicast message and forbids it to enter into the multicast network.

If RP 340 does not receive any response within predefined time after initiating the authentication request, it deems the authentication request for the multicast source of the multicast message as failed, and RP 340 does not register the multicast message and forbids it to enter into the multicast network.

A real time automatic management of multicast sources is implemented by means of initiating authentication requests for multicast sources of multicast messages at the RP in the PIM—SM multicast network, restricting multicast sources from sending multicast messages to multicast groups to protect the PIM—SM multicast network against attacks of multicast messages from unauthorized nodes.

Figure 4:
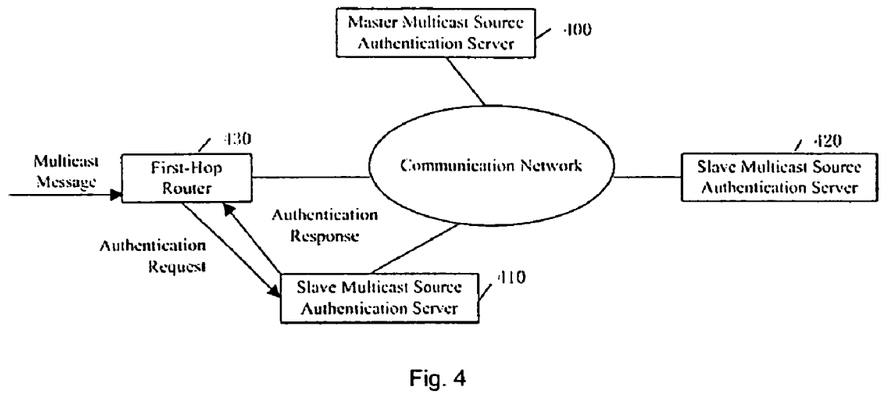
FIG. 4 is a schematic view of a multicast source control system for PIM—DM multicast network according to an embodiment of the present invention.

A system implementing multicast source control in a PIM—DM (Protocol Independent Mode—Dense Mode) multicast network according to an embodiment of the present invention is shown in FIG. 4.

In FIG. 4, a master multicast source authentication server 400 and slave multicast source authentication servers 410 and 420 are deployed. The slave multicast source authentication servers 410 and 420 dynamically update the multicast source authentication information table stored therein, in accordance with a predefined period and the multicast source authentication information table in the master multicast source authentication server 400, respectively. When a user modifies the multicast source authentication information in master multicast source authentication server 400 in accordance with the restriction on multicast address and multicast source, the master multicast source authentication server 400 notifies the slave multicast source authentication servers 410 and 420 that the multicast source authentication information thereof needs to be updated.

For a PIM—DM multicast network, the first-hop router in the PIM—DM multicast network upon entering can be taken as a predefined node. The first-hop router initiates authentication requests to the multicast source authentication server. In FIG. 4, the first-hop router 430 is the predefined node that initiates authentication requests. The slave multicast source authentication server nearest to the first-hop router 430 is selected as the multicast source authentication server thereof; in this embodiment, the multicast source authentication server configured for the first-hop 430 is the slave multicast source authentication server 410.

After the first-hop router 430 receives a multicast message, it initiates an authentication request to the slave multicast source authentication server 410, and the slave multicast source authentication server 410 judges whether the multicast message is permitted to enter into the multicast network according to the content of the authentication request and the content of the multicast source authentication table stored therein.

If the multicast address of the multicast message is within the range of multicast address field in the multicast source authentication information of the slave multicast source authentication server 410, judge whether the multicast source address of the multicast message matches a unicast address corresponding to the multicast address field in the multicast source authentication information table. If it does not match, send response information indicating the authentication request has failed to the first-hop router 430; and the first-hop router 430 does not create a forwarding table item for the multicast message and forbids it to enter into the multicast network. If it matches, send response information indicating the authentication request is successful to the first-hop router 430; the first-hop router 430 creates a forwarding table item for the multicast message and permits it to enter into the multicast network.

If the multicast address of the multicast message is not within the range of multicast address field in multicast source authentication information of the slave multicast source authentication server 410, judge whether it is needed to reinitiate an authentication request for the multicast source. If it is not needed to reinitiate an authentication request, send response information indicating the authentication request has failed to the first-hop router 430; the first-hop router 430 does not create a forwarding table item for the multicast message and forbids it to enter into the multicast network. If it is needed to reinitiate an authentication request, the slave multicast source authentication server 410 sends information obtained by inquiry to the first-hop router 430; the first-hop router 430 continues to reinitiate an authentication request for the multicast source in accordance with the unicast address in the received information.

The number of authentication request for a multicast message should not exceed a predefined number. If the number of authentication request exceeds the predefined number but the first-hop router 430 still does not obtain a response indicating the authentication request is successful, it deems the authentication request for the multicast source of the multicast message as failed, and the first-hop router 430 does not create a forwarding table item for the multicast message and forbids the multicast message to enter into the multicast network.

If the first-hop router 430 does not receive any response within predefined time after initiating the authentication request, it deems the authentication request for the multicast source of the multicast message as failed, and the first-hop router 430 does not create a forwarding table item for the multicast message and forbids the multicast message to enter into the multicast network.

A real time automatic management of multicast sources is implemented by means of initiating authentication requests for the received multicast messages at the first-hop router in the PIM—DM multicast network and restricting multicast sources from sending multicast message to protect the PIM—DM multicast network from attacks of multicast messages from unauthorized sites.

Though the present invention has been described with reference to embodiments, those skilled in the art shall understand that many variations and changes can be made to the embodiments without deviating from the spirit of the present invention. Such variations and changes are intended to fall into the scope of this invention, as defined in the attached claims.

The invention claimed is:

1. A multicast source control method, comprising the steps of:
   a. creating multicast source authentication information in a master multicast source authentication server;
   b. the master multicast source authentication server dynamically updating said multicast source authentication information in accordance with a restriction on a multicast source;
   c. controlling sending a multicast message from the multicast source in accordance with said multicast source authentication information, wherein said multicast source authentication information is recorded in a tabular form; said multicast source authentication information table contains a corresponding relationship between a unicast address and a masked multicast address wherein said masked multicast address is a result of an AND operation on a multicast address contained in the table and an address mask;

wherein said step b further comprises: a plurality of slave multicast source authentication servers, in accordance with the multicast source authentication information in the master multicast source authentication server, updating the multicast source authentication information stored therein at a predefined period; when the multicast source authentication information in said master multicast source authentication server is changed, notifying said slave multicast source authentication server to update the multicast source authentication information stored therein; and wherein said step c further comprises:

c1. after receiving a multicast message sent from the multicast source, a predefined node initiating an authentication request to a preconfigured slave multicast source authentication server thereof;

c2. said preconfigured slave multicast source authentication server performing a longest prefix matching with the multicast source address contained in the authentication request with the multicast address result in the multicast source authentication information table stored therein, and sending a response indicating whether the authentication request is successful to said predefined node according to the matching result, wherein:

c21. if the unicast address corresponding to the matched multicast address in the multicast source authentication table is identical to the multicast source address in said authentication request, sending a response indicating that the authentication request is successful to said predefined node; after receiving the response indicating that the authentication request is successful, said predefined node permitting said multicast message to enter into the multicast network;

c22. if the unicast address corresponding to the matched multicast address in the multicast source authentication table is different from the multicast source address in said authentication request, sending a response indicating that the authentication request has failed, to said predefined node; after receiving the response indicating that the authentication request has failed, said predefined node forbidding said multicast message to enter into the multicast network.

2. The multicast source control method according to claim 1, wherein said multicast source authentication information table further contains records indicating that it is needed for authentication requests to continue to be initiated to other multicast source authentication servers, the records corresponding to addresses of said other multicast source authentication servers.

3. The multicast source control method according to claim 2, wherein said step c2 further comprises:

c23. if the matched multicast address corresponds to an address of other multicast source authentication server, sending said predefined node information indicating that said predefined node information is needed to continue to request for authentication from other multicast source authentication servers, and information of the address of said other multicast source authentication servers; said predefined node reinitiating an authentication request for the multicast source of said multicast message according to the received information.

4. The multicast source control method according to claim 3, wherein the method also comprises:

if the number of authentication request sent from said predefined node for the multicast source of said multicast message exceeds a predefined number, the authentication request for the multicast source being deemed as failed.

5. The multicast source control method according to claim 1, wherein the method also comprises: if said predefined node does not receive a response in a predefined time after initiating the authentication request for the multicast source of said multicast message, the authentication request for said multicast source being deemed as failed.

* * * * *